United States Patent
Ruge

(10) Patent No.: US 7,978,204 B2
(45) Date of Patent: Jul. 12, 2011

(54) TRANSPARENCY-CONSERVING SYSTEM, METHOD AND COMPUTER PROGRAM PRODUCT TO GENERATE AND BLEND IMAGES

(75) Inventor: Thomas Ruge, Oakland, CA (US)

(73) Assignee: NVIDIA Corporation, Santa Clara, CA (US)

( * ) Notice: Subject to any disclaimer, the term of this patent is extended or adjusted under 35 U.S.C. 154(b) by 430 days.

(21) Appl. No.: 11/412,406

(22) Filed: Apr. 26, 2006

(65) Prior Publication Data

US 2006/0244758 A1     Nov. 2, 2006

Related U.S. Application Data

(60) Provisional application No. 60/676,254, filed on Apr. 29, 2005, provisional application No. 60/676,240, filed on Apr. 29, 2005, provisional application No. 60/676,241, filed on Apr. 29, 2005.

(51) Int. Cl.
    G09G 5/02         (2006.01)
(52) U.S. Cl. ........ 345/592; 345/581; 345/589; 345/502; 345/503; 345/505; 345/606; 345/634
(58) Field of Classification Search ............ 345/592
    See application file for complete search history.

(56) References Cited

U.S. PATENT DOCUMENTS

| | | |
|---|---|---|
| 5,182,797 A | 1/1993 | Liang et al. |
| 5,265,203 A | 11/1993 | Peaslee et al. |
| 5,371,849 A | 12/1994 | Peaslee et al. |
| 5,398,315 A | 3/1995 | Johnson et al. |
| 5,548,737 A | 8/1996 | Edrington et al. |
| 5,655,120 A | 8/1997 | Witte et al. |
| 5,714,997 A | 2/1998 | Anderson |
| 5,745,125 A | 4/1998 | Deering et al. |
| 5,872,972 A | 2/1999 | Boland et al. |
| 5,896,139 A | 4/1999 | Strauss |
| 6,128,642 A | 10/2000 | Doraswamy et al. |
| 6,243,107 B1 | 6/2001 | Valtin et al. |
| 6,292,200 B1 | 9/2001 | Bowen et al. |
| 6,292,822 B1 | 9/2001 | Hardwick |
| 6,373,977 B1 | 4/2002 | Culbertson |
| 6,438,576 B1 | 8/2002 | Huang et al. |
| 6,459,429 B1 | 10/2002 | Deering |
| 6,795,076 B2 * | 9/2004 | Deering et al. ............... 345/502 |
| 6,927,783 B1 * | 8/2005 | MacInnis et al. ............. 345/629 |

(Continued)

FOREIGN PATENT DOCUMENTS

CN     01813014.3     6/2005

(Continued)

*Primary Examiner* — Antonio A Caschera
(74) *Attorney, Agent, or Firm* — Zilka-Kotab, PC

(57) ABSTRACT

A1A system embodying the invention includes a controlling device and a set of rendering devices, with the effect that the controlling device can distribute a set of objects to the rendering devices. Each rendering device computes a (2D) image in response to the objects assigned to it, including computing multiple overlapping images and using a graphics processor to blend those images into a resultant image. To interface with the graphics processor, each rendering device spoofs the α-value with a pixel feature other than opacity (opacity is expected by the graphics processor), with the effect that the graphics processor delivers useful α-values, while still delivering correct color values, for each pixel. This has the effect that the resultant images include transparency information sufficient to combine them using transparency blending.

21 Claims, 2 Drawing Sheets

U.S. PATENT DOCUMENTS

| | | | |
|---|---|---|---|
| 6,933,947 B2 * | 8/2005 | Platt et al. | 345/589 |
| 7,042,463 B2 | 5/2006 | Kitsutaka | |
| 7,505,046 B1 * | 3/2009 | Louveaux | 345/619 |
| 2002/0002587 A1 | 1/2002 | Kecik et al. | |
| 2002/0030694 A1 * | 3/2002 | Ebihara et al. | 345/634 |
| 2003/0189574 A1 | 10/2003 | Ramsey | |
| 2003/0191860 A1 | 10/2003 | Gadepalli et al. | |
| 2006/0244758 A1 | 11/2006 | Ruge | |

FOREIGN PATENT DOCUMENTS

| | | |
|---|---|---|
| WO | WO 02/07449 A2 | 1/2002 |
| WO | WO 2006/119078 A2 | 11/2006 |

* cited by examiner

US 7,978,204 B2

TRANSPARENCY-CONSERVING SYSTEM, METHOD AND COMPUTER PROGRAM PRODUCT TO GENERATE AND BLEND IMAGES

BACKGROUND OF THE INVENTION

1. Field of the Invention

The invention relates to alpha blending and the art of combining separate images that carry transparency or opacity information.

2. Related Art

In some applications of computing devices, it is desirable to present a visualization of a scene to a user. Some of these applications include the following:

- CAD (computer aided design);
- computer aided search, such as used in the oil and gas industry;
- computer simulations, such as battlefield simulations and flight simulation; and
- video games, including multiplayer video games.

A first problem in the known art is how to blend transparent (or partially transparent) components, such as for example a view of a window, a tinted window, or a translucent plastic object. This problem can occur in different computer-graphics applications. One of these applications is the blending of different computer-generated images into one image.

Known solutions include associating each pixel in the 2D (two dimensional) image with an $\alpha$-value representing opacity, where "opacity" is the complement of transparency, that is, opacity+transparency=1, where opacity and transparency are each in the real-number range [0, 1]. The OpenGL standard for computing 2D/3D images has known functions for computing opacity values. Graphics hardware compatible with the OpenGL standard implements these known functions, with the effect that a graphics programmer can take advantage of the graphics hardware's substantial additional speed with respect to a general-purpose processor.

A drawback of the known solutions is that the opacity-values of images rendered by graphics hardware do not reflect the accumulated opacity per pixel at the end of the rendering process. This accumulated opacity is necessary, if several images, independently rendered have to be correctly blended into one image. In Today's art, the opacity value at the end of the rendering process doesn't carry any usable meaning related to transparency or opacity.

A second problem in the known art is that computing an image to be presented (whether from a 2D image description, or from a 3D scene description) requires relatively large resources, including both computing power and memory.

Known solutions include breaking up computing the scene into parts, and assigning each of those parts to a separate graphics processor. These separate graphics processors each operate under control of a single controlling processor, which determines how to break up computing the scene into parts. The controlling processor sends each separate graphics processor a set of commands telling the receiver what to render. Each graphics processor generates data showing how to render its part of the scene. This data might be sent back to the controlling processor for presentation, or might be sent on to a presenting device, such as a graphics compositor, a monitor, or a set of monitors.

The data generated by different graphic processors, sent to a controlling processor need to be blended into one correct image.

Known Methods of rendering images that generate opacity values in order to blend several pixels into one pixel generate meaningless opacity values for the final pixel. But in order to be able to blend several images into one, the conservancy of the opacity value is necessary.

One possibility might be to combine the images using software on a general-purpose processor. This possibility is subject to the drawback that a general-purpose processor would be substantially slower than graphics hardware.

Accordingly, it would be advantageous to provide methods and systems in which images might be blended and combined, which are not subject to drawbacks of the known art.

The known art includes the following documents:

R. ROST, OPENGL (ISBN 0-321-19789-5). See, e.g., page 385.

WOO, ET AL., OPENGL ($3^{rd}$ edition, version 1.2) (ISBN 0-201-60458-2). See, e.g., page 234.

Duff, *Compositing 3D rendered images,* SIGGRAPH Proceedings, 1985, pages 41-44.

Haeberli & Voorhies, 1994.

Paul Bourke, December 2002, http://astronomy.swin.edu.au/~pbourke/colour/composite/

No admission is made with respect to these or any other documents.

SUMMARY OF THE INVENTION

The invention provides techniques, embodied in methods and systems, including transparency conserving alpha blending.

A system embodying the invention includes a controlling device and a set of rendering devices, with the effect that the controlling device can distribute a set of objects to the rendering devices. Each rendering device computes a (2D) image in response to the objects assigned to it, including computing multiple overlapping images and using a graphics processor to blend those images into a resultant image. To interface with the graphics processor, each rendering device spoofs the $\alpha$-value with a pixel feature other than opacity (opacity is expected by the graphics processor), with the effect that the graphics processor delivers useful $\alpha$-values, while still delivering correct color values, for each pixel. This has the effect that the resultant images include transparency information sufficient to combine them using transparency blending instead of alpha blending. Since the transparency is defined by 1—opacity, this operation leads mathematically to the same results, but allows the usage of graphics hardware and existing software standards like OpenGL.

This invention shows a) a method to generate individual images with correct opacity-values, b) how to compose several images correctly with the conservation of the accumulated opacity and how to use standard OpenGL-commands to achieve this. Crucial to this invention was the discovery that rather using the opacity values of pixels (which is the only way supported in OpenGL), the methods proposed here can only be efficiently implemented by interpreting the opacity values as transparency values.

After reading this application, those skilled in the art would recognize that the invention provides an enabling technology by which substantial advance is made in the art of rendering scenes.

For example, the invention might be used to provide one or more of, or some combination or extension of, any of the following.

- rendering 3D scenes in substantially real-time, such as for example as might be used in battlefield simulations, flight simulations, other testing or training devices, and the like;

rendering 3D scenes in various detail and from various selected perspectives, such as for example as might be used in computer-aided design, in examination of computer simulations of natural phenomena such as weather simulations or wind-tunnel simulations, and the like; and rendering 3D scenes to present information, such as for example as might be used in computer-aided presentation or search of databases, user interfaces for computer-aided control of real-time systems or other systems, and the like.

After reading this application, these and other and further uses of the invention would be clear to those skilled in the art.

INCORPORATED DISCLOSURE

Figure 1:
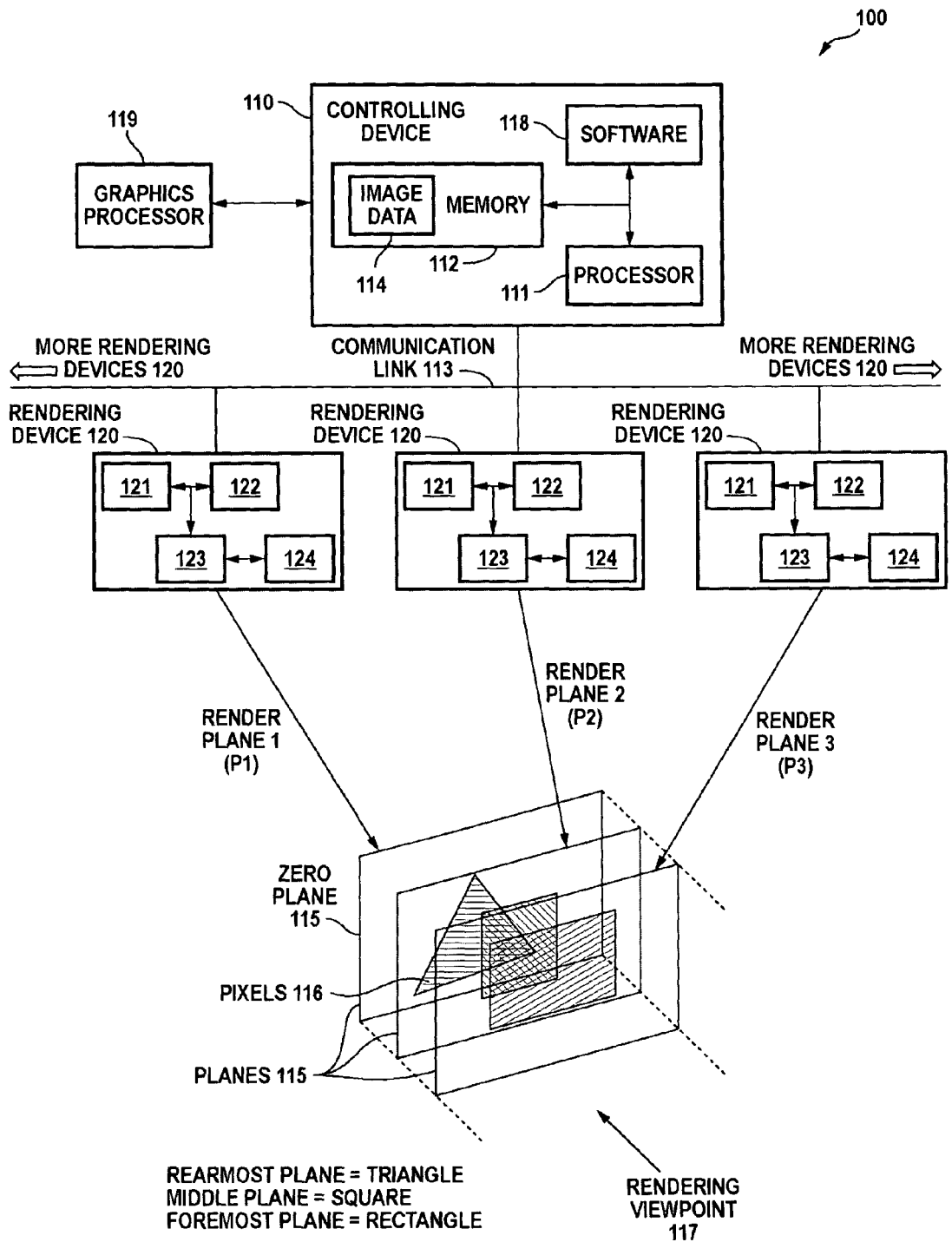
FIG. 1 shows a block diagram of a system including a controlling device and a set of rendering devices, each rendering device including a general-purpose processor and an associated graphics processor.

This application incorporates by reference and claims priority of at least the following documents.

Application Ser. No. 60/676,254, filed Apr. 29, 2005, in the name of inventor Thomas Ruge, titled "Alpha Blending", Application Ser. No. 60/676,240, filed Apr. 29, 2005, in the name of inventor Thomas Ruge, titled "Scene Splitting for Perspective Presentations", Application Ser. No. 60/676,241, filed Apr. 29, 2005, in the name of inventor Thomas Ruge, titled "Compression of Streams of Rendering Commands", These documents are hereby incorporated by reference as if fully set forth herein, and are sometimes referred to herein as the "incorporated disclosure". Inventions described herein can be used in combination or conjunction with technology described in the incorporated disclosure.

DETAILED DESCRIPTION OF THE PREFERRED EMBODIMENT

The description includes a preferred embodiment of the invention, including preferred process steps and data structures. Those skilled in the art would realize, after perusal of this application, that embodiments of the invention might be implemented using a variety of other techniques not specifically described, without undue experimentation or further invention, and that such other techniques would be within the scope and spirit of the invention.

DEFINITIONS

The general meaning of each of these following terms is intended to be illustrative and in no way limiting.

The phrases (1) "controlling device" and (2) "rendering device", and the like, refer respectively to devices for (1) controlling the allocation of rendering commands, and (2) actually rendering 3D scenes and 2D images of those 3D scenes from a selected perspective, as further described below.

In one embodiment, there is a single controlling device and as many rendering devices as necessary so that information for rendering each portion can be rendered with that information fitting into the graphics memory of at most one rendering device. However, in the context of the invention, there is no particular requirement of having only a single controlling device or of having a specified number of rendering devices.

The phrases "model", "3D scene", and the like, refer to facts and information about objects in the 3D scene used to represent those objects, as further described below.

In one embodiment, a "model" includes information about what objects are to be represented in the 3D scene, as distinguished from a "3D scene", which includes information about where objects are placed in an encompassing volume, what they look like, and what their effects are on viewing other such objects (i.e., whether they are opaque, transparent, translucent, reflective, and the like).

The phrases "rendering viewpoint", "visualization of a scene", "front", "2D image", and the like, refer to facts and information about the 2D image or images used to represent objects in the 3D scene, as further described below.

In one embodiment, the "rendering viewpoint" might be static, or might be dynamic, such as in response to (1) controls by a user, (2) a set of sensors, such as motion sensors focused on the user, (3) a time-varying parameter, such as in a roller-coaster ride, and the like. The "front" of a 3D scene is that 2D image presented to a viewer at the rendering viewpoint.

In one embodiment, a "2D image" includes a set of information for 2D presentation, such as for example pixel values for color (e.g., red, green, and blue) or a set of presentable polygons or vectors. In the context of the invention, there is no particular requirement of any one selected representation of a 2D image, nor is there any particular requirement of actually presenting the 2D image to a user.

The phrases "alpha value", "alpha blending", and the like, refer to values assigned to pixels and manipulated by one or more graphics processors, as further described below. The term "$\alpha$" and the phrase "$\alpha$-value" are identical to the phrase "alpha value". As described herein, $\alpha$-values have a standardized treatment by the OpenGL standard, to which graphics processors adhere.

The phrases "spoofing the alpha value", "opacity", "transparency", "transparency blending", and the like, refer to meanings assigned to $\alpha$-values for each pixel, as further described below.

The transparency t of a pixel is defined by $t=1-\alpha$. $\alpha$ is the Opacity "Opacity" is the standardized meaning for the $\alpha$-value for each pixel. The OpenGL standard, and the graphics processor hardware, treats the $\alpha$-value for each pixel as having this meaning. However, embodiments of the invention give a non-standard meaning to the $\alpha$-value for each pixel. As described below, this is sometimes herein called "spoofing the $\alpha$-value" or "spoofing $\alpha$-values."

Embodiments of the invention maintain values for transparency and perform techniques for transparency blending, while still using the substantially greater speed of the graphics processor, as described below.

The scope and spirit of the invention is not limited to any of these definitions, or to specific examples mentioned therein, but is intended to include the most general concepts embodied by these and other terms.

System Elements

FIG. 1 shows a block diagram of a system including a controlling device and a set of rendering devices, each rendering device including a general-purpose processor and an associated graphics processor.

A system 100 includes elements as shown in FIG. 1, plus possibly other elements as described in the incorporated disclosure. These elements include at least a controlling device 110 and a set of rendering devices 120.

Controlling Device and Rendering Devices

The controlling device 110 includes elements as shown in FIG. 1, plus possibly other elements as described in the incorporated disclosure. These elements induced at least a processor 111, memory 112, and a communication link 113 coupling it to the rendering devices 120.

The memory 112 includes a set of image data 114, disposed in a plurality of planes 115 (shown in the figure in a conceptual format), each one of which includes a plurality of pixels 116, each one of which includes a set of color values and an $\alpha$-value (also shown in the figure in a conceptual format). In one embodiment, the image data 114, the planes 115, and the pixels 116 are all responsive to a model of a 3D scene, and a rendering viewpoint 117 with respect to that 3D scene.

In preferred embodiments, the color values include a set of RGB (red, green, blue) values; however, in the context of the invention, there is no particular requirement that the color values include RGB. In alternative embodiments, possibly including alternative graphics hardware, the color values may include YUV values or other values sufficient to represent pixels for presentation.

The processor 111 (for the controlling device 110) operates under control of software 118 disposed for spoofing $\alpha$-values and for computing $\alpha$-values, possibly with the aid of a graphics processor 119 (for the controlling device 110), as described below.

Each rendering device 120 includes a processor 121, memory 122, and an associated graphics processor 123. The processor 121 (for the rendering device 120) Operates under control of software 124 disposed for spoofing $\alpha$-values and for operating in cooperation with the graphics processor 123 (for the rendering device 120) to compute $\alpha$-values.

In preferred embodiments, each rendering device 120 includes a separate computing device, with a separate processor 121 and memory 122, from the controlling device 110. However, in the context of the invention, there is no particular requirement that the controlling device 110 and the rendering devices 120 must be physically distinct. In alternative embodiments, the controlling device 110 and the rendering devices 120 might share at least some hardware or software, or might be separate processes, threads, or other computing instances in a multi-processor or single-processor system.

Computing 2D Images

As described above, the image data 114 is disposed in a plurality of planes 115, each representing a portion of a 3D scene (collectively including all the planes 115) to be rendered into a 2D image for presentation to a user, with respect to a rendering viewpoint 117. Those skilled in the art, after reading this application, would understand that the planes 115 are subject to ordering from back-to-front, and that each pixel 116 in the front-most plane 115 is rendered with respect to information about its transparency and those pixels 116 in those planes 115 behind it. In a preferred embodiment, the following steps are performed:

1. Rendering each of the planes 115 with the correct transparency or opacity value ("Transparency-Conserving Method to Render Images")
2. Blend all planes 115 into one image ("Transparency-Conserving Blending")

As described above, each pixel 116 includes a set of color values, preferably RGB values, and an $\alpha$-value, the latter being interpreted by the OpenGL standard and by the graphics processor as an opacity value.

In the discussion herein, there is no loss of generality in treating each of the separate color values equally. Accordingly, each pixel 116 is presumed to include a single "color value," even though that color value actually includes red, green, and blue elements, and a single "$\alpha$-value."

In the area of computer graphics blending operations are a crucial part of operations. Blending operations can be necessary if one pixel representing a portion of a semi-transparent object is rendered on top of another pixel (e.g. a colored window in front of a wall). This is also reflected by the fact that graphic standards like OpenGL and Direct3D define alpha-blending commands that can be executed on graphics hardware (e.g. graphic processors).

The general blending operation to blend pixels with the colors $C_1$ and $C_2$ is:

$$C_p = C_1 \cdot B_1 + C_2 \cdot B_2 \qquad (130)$$

(see also Woo et al., OpenGL (4$^{th}$ ed., version 1.4), p. 226)

where $C_i$ is a 4-dimensional vector with 3 color components (red, green, blue) and one alpha value (opacity value), it represents the color and alpha value of pixel i.

$B_i$ is the 4-dimensional blending factor i

The multiplication and addition is component wise.

One common situation is to blend pixels together, where pixel 1 is in front of pixel 2. P. Haeberli and D. Voorhies presented in 1994 a way to blend pixels by using interpolation operations, which are today implemented in hardware or software in most graphics-system available today. The value of the resulting pixel $C_{pixel}$ is a linear interpolation depending on the opacity value $\alpha$ of the front pixel $C_{front}$:

$$C_{pixel} = (\alpha_{front})(C_{front}) + (1 - \alpha_{front})(C_{rear}) \qquad (131a)$$

where $C_{pixel}$ is the color value of the new pixel;

$\alpha_{front}$ is the $\alpha$-value of the old front pixel, same as $C_1[4]$;

$C_{front}$ is the color value of the old front pixel; and $C_{rear}$ is the color value of the old rear pixel.

Referring to equation 130, $C_p = C_{pixel}$, $C_1 = C_{front}$, $C_2 = C_{rear}$, $B_1 = (\alpha_{front}, \alpha_{front}, \alpha_{front}, \alpha_{front})$
$B_2 = (1 - \alpha_{front}, 1 - \alpha_{front}, 1 - \alpha_{front}, 1 - \alpha_{front})$ The OpenGL standard, as implemented in hardware by each graphics processor 123 at rendering devices 120, includes a function call glBlendFunc ("GL blend function") for which these values are input:

$$\text{glBlendFunc (factor1, factor2)} \qquad (131b)$$

where factor1 is the blending factor $B_1$ and factor2 is the blending factor $B_2$ glBlendFunc defines how pixel (here front pixel) values being processed with those already stored (here rear pixel). In most 3D-applications, the rear pixel is presented by a rendering buffer, that represent the outcome of all rendering commands so far. The front pixel is usually the outcome of a subsequent rendering command. glBlendFunc only knows one blending factor for all color values and the alpha value, this means this function simplifies $B_i$ to a scalar. The correct call of this function in order to blend pixels following eq. 131a is:

$$\text{glBlendFunc(GL\_SRC\_ALPHA, GL\_ONE\_MI-} \\ \text{NUS\_SRC\_ALPHA)} \qquad (131c)$$

where
glBlendFunc is the appropriate OpenGL function call; and
_GL_SRC_ALPHA stands for $B_1=(\alpha_{front}, \alpha_{front}, \alpha_{front}, \alpha_{front})$ and
_ONE_MINUS_SRC_ALPHA stands for $B_2=(1-\alpha_{front}, 1-\alpha_{front}, 1-\alpha_{front}, 1-\alpha_{front})$ For this function, the value of $\alpha_{rear}$ is ignored by the graphics processor 123.

The OpenGL standard, as implemented in hardware by each graphics processor 123 at rendering devices 120, produces $C_{pixel}$ as described in equation 131a. It also produces $\alpha_{pixel}$ as described in equation 132.

$$\alpha_{pixel}=(\alpha_{front})(\alpha_{front})+(1-\alpha_{front})(\alpha_{rear}) \quad (132)$$

where $\alpha_{pixel}$ is the α-value of the new pixel.

This is a direct effect of computing both the color elements of the new pixel ($C_{pixel}$) and the α-value of the new pixel ($\alpha_{pixel}$) in like manner. Unfortunately, this computed value of $\alpha_{pixel}$ is rather meaningless, with the effect of not being useful for further combining planes 115 of pixels 116.

The OpenGL standard, as implemented in hardware by each graphics processor 123 at rendering devices 120, also includes a function glBlendFuncSeparate ("GL blend function separate"), which operates similarly to glBlendFunc, but with additional parameters. This is shown in equation 133a.

glBlendFuncSeperate(colorfactor1, colorfactor2, alphafactor1, alphafactor2)    (133a)

where colorfactor 1 is the first 3 components of blending factor $B_1$,
colorfactor 2 is the first 3 components of blending factor $B_2$,
alphafactor1 is the $4^{th}$ component of $B_1$
alphafactor2 is the $4^{th}$ component 4 of $B_2$ The difference between glBlendFunc and glBlendFuncSeperate is that glBlendFuncSeperate treats the alpha and the color values of the incoming pixels with different factors.

The invention shows that by using the function glBlendFuncSeperate in a certain way, and therefore slightly modifying the rendering process, that the computed alpha-values can be accumulated and preserved for following compositing operations.

Spoofing α-Values/Transparency-Conserving Method to Render Images

The first part of the patent shows by using the function glBlendFuncSeperate in the described way, and therefore slightly modifying the rendering process, that the computed alpha-values can be accumulated and preserved for following compositing operations.

As described herein, while it would be possible to compute a new and useful α-value ($\alpha_{pixel}$) by the processor 121, it would be preferable to cause the graphics processor 123 to make that computation, because the graphics processor executes these commands much faster on more efficient graphics dedicated memory.

The following describes the first part of the invention, how to conserve transparency values with OpenGL standard commands, by re-interpreting alpha values as transparency values.

By introducing the notion of the transparency in the rendering process and replacing the alpha value, graphics hardware can be used to generate meaningful alpha/transparency values.

Proper computation for each pixel 116 involves a product of the transparencies of each pixel 116 in each plane 115 behind (and including) that pixel 116. This is shown in equation 134.

$$t_{total} = \prod_{(\text{all planes})} (t_{plane}) \quad (134)$$

where $t_{plane}$ is the transparency of that pixel for a particular plane; and $t_{total}$ is the transparency of the new pixel.

This has the effect that when the transparency of a pixel 116 on a plane 115, $t_{plane}$, is zero (completely opaque), it is not possible to see behind that pixel 116 into those planes 115 behind it with respect to the rendering viewpoint 117, and the transparency for the new pixel 116 should also be zero (completely opaque). Similarly, when the transparency of a pixel 116 on a plane 115, $t_{plane}$, is one (completely transparent), that pixel 116 has no effect on viewing those planes 115 behind it with respect to the rendering viewpoint 117, and the transparency for the new pixel 116 should be identical to the corresponding pixel 116 on the plane 115 just behind it.

In one embodiment, the α-value associated with a pixel 116 is spoofed to not represent the opacity measure expected by the OpenGL standard and by the graphics processor 123. Instead, the α-value associated with each pixel 116 represents a different measure entirely (the transparency instead of the opacity).

In one embodiment, the α-value associated with each pixel 116 instead represents a transparency measure, that is, (1—opacity). This transparency measure is still within the real-number range [0, 1]. However, it is possible to use the OpenGL standard, and the graphics processor 123, to compute the α-value for each pixel, in order to retain meaningful and useful transparency measures. To perform this function involves an unusual computation of the α-value for each pixel. The necessary Blending operation is shown in 135a.

glBlendFuncSeperate(GL_ALPHA-SRC, GL_ONE_MINUS_ALPHA_SRC, GL_ZERO, GL_ONE_MINUS_ALPHA_SRC)    (135a)

This has the effect that the function GLBlendFuncSeparate operates to compute $C_{pixel}$ and $\alpha_{pixel}$ separately, as described in equations 135b and 135c.

$$C_{pixel}=(\alpha_{front})(C_{front})+(1-\alpha_{front})(C_{rear}) \quad (135b)$$

135b gives the standard blending operation for the color parts of the pixel as shown in 131a.

$$\alpha_{pixel}=(0)(\alpha_{front})+(1-\alpha_{front})(\alpha_{rear}) \quad (135c)$$

In order to understand 135c better the equation is rewritten to:

$$t_{pixel}=(0)(\alpha_{front})+(1-\alpha_{front})(t_{rear}) \quad (135d)$$

$\alpha_{rear}$ and $\alpha_{pixel}$ are spoofed alpha values, which are interpreted as transparency values $t_{rear}$ and $t_{pixel}$. $\alpha_{front}$ is not a spoofed alpha value, in 135b it is used in order to blend the colors of two pixels correctly. By rewriting this formula by using $t_{front}=1-\alpha_{front}$ 135d and $(0)(\alpha_{front})=0$ gets simplified to 135e:

$$t_{pixel}=t_{front} \cdot t_{rear} \quad (135e)$$

Using this formula every time the rendering device 120 gets the command to blend pixels leads to 134. Note: In order to manipulate existing 3D-applications and apply the described method, one way is to intercept glBlendFunc (GL_SRC_ALPHA, GL_ONE_MINUS_SRC_ALPHA) calls and turn them into glBlendFuncSeperate(GL_ALPHA_SRC, GL_ONE_MINUS_ALPHA_SRC, GL_ZERO, GL_ONE_MINUS_ALPHA_SRC)-calls. This allows for most 3-D applications that use blending operations to use the alpha-buffer to conserve meaningful transparency values for subsequent image blending operations.

In this first part of the invention it was shown how to use OpenGL-standard operations to preserve meaningful transparency values that will be needed in the second part of the invention.

After reading this application, those skilled in the art will see that $C_{pixel}$ is computed in the standard way. The pixel 116 can thus be presented to the user without any change.

However, $\alpha_{pixel}$ is computed in a nonstandard way. This has the effect that the spoofed α-value is properly computed. The factor $(1-\alpha_{front})$ represents the complement of an opacity measure received from an application program. This has the effect that the factor $(1-\alpha_{front})$ represents a transparency measure. The spoofed α-value for the rear pixel 116 has already been computed using the nonstandard technique. This has the effect that it already represents a transparency measure.

The spoofed α-value for the rear pixel 116 ($\alpha_{rear}$) is multiplied by the spoofed α-value for the front pixel 116 $(1-\alpha_{front})$. This has the effect that the product of the transparency measures is computed. When all pixels 116 on all planes 115 have been so computed, the color value for the new pixel 116 ($C_{pixel}$), to be presented, is correct. When all pixels 116 on all planes 115 have been so computed, the spoofed α-value for the new pixel 116 ($\alpha_{pixel}$) are also correctly representing valid transparency values.

Parallel Rendering/Transparency-Conserving Blending

The second part of the invention shows how images that have been prerendered according to the first part of the description above, "Spoofing α-values/Transparency-Conserving Method to Render Images".

In the following all α-values are spoofed, therefore represent transparencies rather than opacities as described in "Spoofing α-values". The term α-values is still used since OpenGL doesn't handle transparencies explicitly, this also helps to explain how the invention uses OpenGL-standard commands in order to perform transparency-blending operations.

When a (3D) scene is to be rendered, the controlling device 110 allocates portions of that scene to be rendered by each of the rendering devices 120. Each rendering device 120 uses the techniques described above to blend transparency values using spoofing of α-values. This has the effect of producing, for each rendering device 120, a combined (2D) image with correct color values with spoofed α-values, for each pixel (RGBA-buffer).

Once each rendering device 120 has generated a image, those images are collected, either by the controlling device 110 or by a compositing device, and combined into a single image to be presented to the user. This has the effect that the rendering devices 120 operate concurrently or in parallel to provide the image to be presented to the user.

In the event there is only a single image to be presented, such as for example when viewing a processed set of large datasets, that image can be presented substantially faster than if it was not computed in parallel to be presented. This has the effect that the user can review data sets without an undue wait. In the event there are multiple images to be presented, such as for example when viewing a sequence of images to be rendered as in a motion picture, each image frame can be presented substantially faster than if it was not computed in parallel to be presented. This has the effect that the user can view a motion picture generated by the controlling device 110 and the rendering devices 120, either more quickly or with more detail, as preferred by the user.

To combine the multiple results from the rendering devices 120, the controlling device 110 (or the compositing device, if one is used) computes a base plane 115 in which each pixel 116 is initialized to a color value Cpixel=zero (that is, no color), and a spoofed α-value, tpixel=one (that is, completely transparent). This is shown in equation 136a.

$$\{C_{pixel}, \alpha_{pixel}\} = GL\text{Color [init}^{Color}, \text{init}^\alpha] \quad (136a)$$

where
GLColor is the appropriate OpenGL function call;
$\text{init}^{Color}$ is the initial value of $C_{pixel}$; and
$\text{init}^\alpha$ is the initial value of the spoofed α-value, $\alpha_{pixel}$.

The initial value for $C_{pixel}$ is zero, represented as $\{0, 0, 0\}$ for zero red, zero green, and zero blue. The initial value for $\alpha_{pixel}$ is 1. This is shown in equation 136b.

$$\{C_{pixel}, \alpha_{pixel}\} = GL\text{Color }[\{0, 0, 0,\}, 1] \quad (136b)$$

In OpenGL-notation the following command is used to preset/clear the DrawBuffer:

$$\text{glClearColor}(0.0, 0.0, 0.0, 1.0) \quad (136c)$$

Each rendering device 120 generates a plane 115 of pixels 116, each having a color value $C_{pixel}$ and an α-value $\alpha_{pixel}$. The controlling device 110 (or a compositing device, if one is used) blends all planes 115 from the rendering devices 120 into one final image (represented by a buffer called blending buffer). First the blending buffer on the controlling device 110 will be preset according to 136c. Then the controlling device lo blends one plane 115 from a rendering device 120 after another (from back to front) with the blending buffer following Blending algorithm 137c. For n planes 115 this takes n steps. At the end the blending buffer contains the correct image and can be presented unmodified to the user 150.

$C_{front}$, $\alpha_{front}$=Color-/α-value of the front-buffer (one plane 115 from rendering device 120)
$C_{rear}$, $\alpha_{rear}$=Color-/α-value of the blending buffer before the next blending step
$C_{total}$, $\alpha_{total}$=Color-/α-value of the blending buffer after the next blending step After reading this application, those skilled in the art will see that in some embodiments, the controlling device 110 might perform these computations itself, might enlist the aid of its own graphics processor 119, or might enlist the aid of graphics processors 123 from one or more of the rendering devices 120. Similarly, in other embodiments, a compositing device might perform these tasks, which might similarly enlist the aid of its own graphics processor 119, or might enlist the aid of graphics processors 123 from one or more of the rendering devices 120.

As with the computation performed at each rendering device 120, the controlling device 110 makes a nonstandard use of the OpenGL standard, and of its own graphics processor 119, if one is present. The nonstandard use is shown in equation 137a.

$$\{C_{pixel}, \alpha_{pixel}\} = \text{GLBlendFuncSeparate }[1, \alpha_{front},$$
$$0, \alpha_{front}] \quad (137a)$$

where
$f^{Cfront}$, the factor to apply to the color value of the front pixel, has been set to 1;
$f^{Crear}$, the factor to apply to the color value of the rear pixel, has been set to $\alpha_{front}$;

$f^{\alpha front}$, the factor to apply to the α-value of the front pixel, has been set to 0; and $f^{\alpha rear}$, the factor to apply to the α-value of the rear pixel, has also been set to $\alpha_{front}$.

This nonstandard use of the OpenGL standard, and of the graphics processor 119 aiding the controlling device 110, produces correct values for both the total color value Ctotal of the new pixel and the total α-value $\alpha_{total}$ of the new pixel. In the event that the new pixel is computed for the front plane 115 (with respect to the rendering viewpoint 117), the total color value $C_{total}$ is suitable to be presented to the user. The total α-value $\alpha_{total}$ is also accurate, but presentation devices ordinarily do not use the total α-value. This is shown in equations 137b and 137c.

$$C_{total}=(1)(C_{front})+(\alpha_{front})(C_{rear}) \quad (137b)$$

$$\alpha_{total}=(0)(\alpha_{front})+(\alpha_{front})(\alpha_{rear}) \quad (137b)$$

In OpenGL notation the correct blending function is therefore:

$$\text{glBlendFuncSeperate(GL\_ONE, GL\_ALPHA\_SRC, GL\_ZERO, GL\_ALPHA\_SRC)} \quad (137c)$$

The total color value, $C_{total}$, is computed using (1) ($C_{front}$) because the color value of the front pixel, $C_{front}$, was already multiplied by $\alpha_{front}$ when it was computed by its respective rendering device 120. This has the effect that the controlling device 110 computes the correct total color value, $C_{total}$, to be presented.

The total α-value, $\alpha_{total}$, is comuted using (0) ($\alpha_{front}$) because its other term, ($\alpha_{front}$) ($\alpha_{rear}$), is precisely the product of ($t_{front}$) ($t_{rear}$). This is described above as the desired α-value with respect to equation 134. This has the effect that for each plane 115 that is considered, the computed total transparency measure, $t_{total}$, is correctly computed using techniques involving spoofing the α-value.

This method represents the second part of the invention.

Method of Operation

Figure 2:
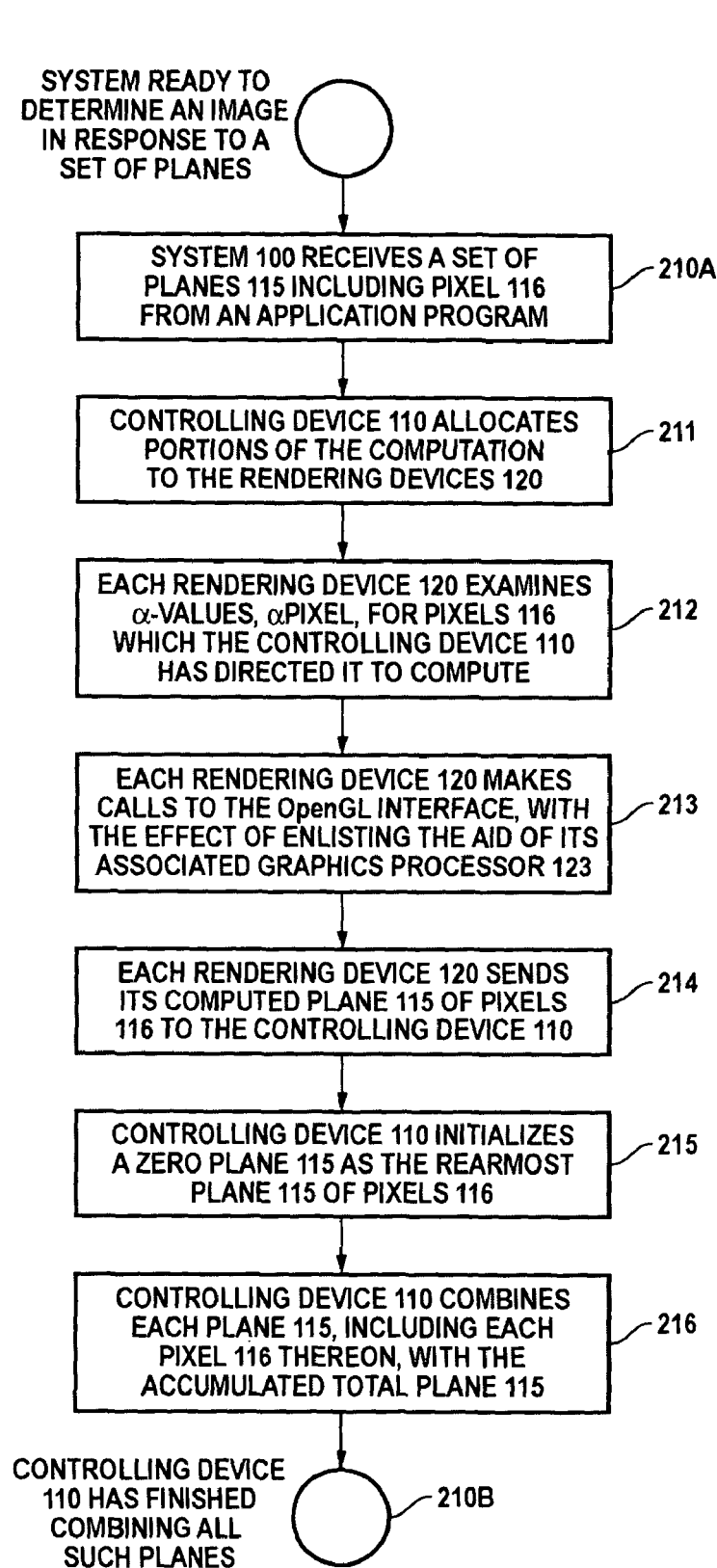
FIG. 2 shows a process flow diagram of a method of rendering an image using a general-purpose processor and an associated graphics processor.

FIG. 2 shows a process flow diagram of a method of rendering an image using a general-purpose processor and an associated graphics processor.

Although described serially, the flow points and method steps of the method 200 can be performed by separate elements in conjunction or in parallel, whether asynchronously or synchronously, in a pipelined manner, or otherwise. In the context of the invention, there is no particular requirement that the method must be performed in the same order in which this description lists flow points or method steps, except where explicitly so stated.

The method 200 includes flow points and process steps as shown in FIG. 2, plus possibly other flow points and process steps as described in the incorporated disclosure. These flow points and process steps include at least the following:

A pair of flow points 210A and 210B, and a set of steps performed in-between, in which the method 200 is ready to determine an image in response to a set of planes 115 each having a set of pixels 116, in response to a rendering viewpoint 117.

At a flow point 210A, the system 100 receives a set of planes 115 including pixel 116 from an application program. The application program might execute on the controlling device 110, or preferably, might execute on a separate device and communicate those planes and pixels 116 to the controlling device 110. P At a step 211, the controlling device 110 allocates portions of the computation to the rendering devices 120. Each rendering device 120 uses techniques described herein for spoofing the α-value.

At a step 212, each rendering device 120 examines α-values, $\alpha_{pixel}$, for pixels 116 which the controlling device 110 has directed it to compute. For application programs operating using standard methods, the α-value represents an opacity measure.

At a step 213, each rendering device 120 makes calls to the OpenGL interface, with the effect of enlisting the aid of its associated graphics processor 123, as described above. Each rendering device 120 and its graphics processor 123 compute color values, $C_{pixel}$, and α-values, $\alpha_{pixel}$. As described above, the color values, $C_{pixel}$, are computed using standard techniques. The α-values, $\alpha_{pixel}$, are computed using nonstandard techniques.

At a step 214, each rendering device 120 sends its computed plane 115 of pixels 116 to the controlling device 110 (or to a compositing device, if one is present). Each computed plane 115 of pixels 116 includes, for each pixel 116, both the computed color value, $C_{pixel}$, and the computed α-value, $\alpha_{pixel}$.

At a step 215, the controlling device 110 initializes a zero plane 115 as the rearmost plane 115 of pixels 116, as described above. The zero plane 115 includes pixels 116, all of which have color value $C_{zero}=\{0, 0, 0,\}$ and all of which have α-value $\alpha_{zero}=1$. The zero plane 115 is the first accumulated total plane 115.

At a step 216, the controlling device 110 combines each plane 115, including each pixel 116 thereon, with the accumulated total plane 115, using nonstandard techniques as described above.

At a flow point 210B, the controlling device 110 has finished combining all such planes 115 and computing all such pixels 116 thereon.

In one embodiment, the method 200 is repeated rapidly enough that the user sees the (2D) image as a motion picture, with the effect that the user sees the (3D) scene as a virtual reality motion picture. In such embodiments, the model might be responsive to user inputs or other inputs, with the effect that the 3D scene and the rendering viewpoint 117 might change rapidly with time, and with the effect that the user would perceive a view very much like actually interacting with a virtual reality as defined by the model.

Alternative Embodiments

Although preferred embodiments are disclosed herein, many variations are possible which remain within the concept, scope, and spirit of the invention. These variations would become clear to those skilled in the art after perusal of this application.

After reading this application, those skilled in the art will recognize that these alternative embodiments and variations are illustrative and are intended to be in no way limiting. After reading this application, those skilled in the art would recognize that the techniques described herein provide an enabling technology, with the effect that advantageous features can be provided that heretofore were substantially infeasible.

The invention claimed is:

1. A method, including steps of
at a controlling device, assigning a set of objects to be rendered;
distributing those objects to a set of rendering devices;
at each rendering device, (1) computing an image in response to an assigned object, the computing of the image including intercepting a plurality of first blending operations and converting the first blending operations to a plurality of second blending operations, and the image including a set of pixels, each pixel having an α-value, (2) computing multiple overlapping images, (3) using a graphics processor to blend those images;

wherein each rendering device spoofs, utilizing the plurality of second blending operations, the α-value of each pixel of a rendering plane associated with the assigned object with a pixel feature other than opacity, whereby the graphics processor delivers an α-value correctly representing a valid transparency value while still delivering correct color values, for each pixel of the rendering plane associated with the assigned object;

whereby the images produced by each rendering device include transparency information sufficient to combine those images using transparency blending;

wherein each of the rendering devices includes an associated general-purpose processor and the graphics processor separate from the associated general-purpose processor.

2. The method of claim 1, wherein each of the rendering devices and the controlling device are physically distinct.

3. The method of claim 1, wherein the controlling device and the rendering devices include separate threads in a multi-processor system.

4. The method of claim 1, wherein the color value of each pixel is computed separately from the spoofed α-value of each pixel.

5. The method of claim 1, wherein each rendering device blends transparency values using the spoofed α-values.

6. The method of claim 1, wherein the rendering devices operate in parallel.

7. The method of claim 1, wherein the controlling device initializes a zero plane as a rearmost plane of pixels with a color value of 0,0,0 and an α- value of 1, and each of the images are combined in a back to front order after accumulating the zero plane.

8. The method of claim 1, wherein the intercepting of the plurality of first blending operations and the converting of the first blending operations to the plurality of second blending operations allows use of an alpha-buffer to conserve meaningful transparency values for subsequent image blending operations by a 3D application.

9. The method of claim 1, wherein the graphics processor of each rendering device delivers the α-value correctly representing the valid transparency value, and the correct color values, for each pixel of the rendering plane associated with the assigned object, only when all pixels on all planes have been computed.

10. A computer program embodied on a tangible computer readable medium, comprising:
computer code for assigning a set of objects to be rendered;
computer code for distributing those objects to a set of rendering devices;
computer code at each rendering device for (1) computing an image in response to an assigned object, the computing of the image including intercepting a plurality of first blending operations and converting the first blending operations to a plurality of second blending operations, and the image including a set of pixels, each pixel having an α-value, (2) computing multiple overlapping images, (3) using a graphics processor to blend those images;

wherein each rendering device spoofs, utilizing the plurality of second blending operations, the α-value of each pixel of a rendering plane associated with the assigned object with a pixel feature other than opacity, whereby the graphics processor delivers an α-value correctly representing a valid transparency value while still delivering correct color values, for each pixel of the rendering plane associated with the assigned object;

whereby the images produced by each rendering device include transparency information sufficient to combine those images using transparency blending;

wherein each of the rendering devices includes an associated general-purpose processor and the graphics processor separate from the associated general-purpose processor.

11. The computer program of claim 10, wherein each of the rendering devices and a controlling device are physically distinct.

12. The computer program of claim 10, wherein a controlling device and the rendering devices include separate threads in a multi-processor system.

13. The computer program of claim 10, wherein the color value for each pixel is computed separately from the spoofed α-value for each pixel.

14. The computer program of claim 10, wherein each rendering device blends transparency values using the spoofed α-values.

15. The computer program of claim 10, wherein tile rendering devices operate in parallel.

16. A system, comprising:
a controlling device for assigning a set of objects to be rendered and distributing those objects to a set of rendering devices;
each of the rendering devices for (1) computing an image in response to an assigned object, the computing of the image including intercepting a polarity of first blending operations and converting the first blending operations to a plurality of second blending operations, and the image including a set of pixels, each pixel having an α-value, (2) computing multiple overlapping images, (3) using a graphics processor to blend those images;

wherein each rendering device spoofs, utilizing the plurality of second blending operations, the α-value of each pixel of a rendering plane associated with the assigned object with a pixel feature other than opacity, whereby the graphics processor delivers an α-value correctly representing a valid transparency value while still delivering correct color values, for each pixel of the rendering plane associated with the assigned object;

whereby the images produced by each rendering device include transparency information sufficient to combine those images using transparency blending;

wherein each of the rendering devices includes an associated general-purpose processor and the graphics processor separate from the associated general-purpose processor.

17. The system of claim 16, wherein each of the rendering devices and the controlling device are physically distinct.

18. The system of claim 16, wherein the controlling device and the rendering devices include separate threads in a multi-processor system.

19. The system of claim 16, wherein the color value for each pixel is computed separately from the spoofed α-value for each pixel.

20. The system of claim 16, wherein each rendering device blends transparency values using the spoofed α-values.

21. The system of claim 16, wherein the rendering devices operate in parallel.

* * * * *

UNITED STATES PATENT AND TRADEMARK OFFICE
CERTIFICATE OF CORRECTION

| | | |
|---|---|---|
| PATENT NO. | : 7,978,204 B2 | Page 1 of 1 |
| APPLICATION NO. | : 11/412406 | |
| DATED | : July 12, 2011 | |
| INVENTOR(S) | : Ruge | |

It is certified that error appears in the above-identified patent and that said Letters Patent is hereby corrected as shown below:

On the title page:
　　Abstract (57), line 1, please replace "A1A" with --A--.

In the claims:
　　Col. 14, line 23, please replace "tile" with --the--;
　　Col. 14, line 31, please replace "polarity" with --plurality--.

Signed and Sealed this
Eighteenth Day of October, 2011

David J. Kappos
*Director of the United States Patent and Trademark Office*